(12) United States Patent
Warming et al.

(10) Patent No.: US 12,290,018 B2
(45) Date of Patent: May 6, 2025

(54) METHOD AND SYSTEM FOR PLACEMENT OF SINGLE SEEDS ONE BY ONE

(71) Applicant: FarmDroid ApS, Vejen (DK)

(72) Inventors: Kristian Vest Warming, Vejen (DK); Jens Vest Warming, Rødding (DK)

(73) Assignee: FarmDroid ApS, Vejen (DK)

( * ) Notice: Subject to any disclaimer, the term of this patent is extended or adjusted under 35 U.S.C. 154(b) by 896 days.

(21) Appl. No.: 17/479,132

(22) Filed: Sep. 20, 2021

(65) Prior Publication Data

US 2022/0039311 A1 Feb. 10, 2022

Related U.S. Application Data

(63) Continuation of application No. PCT/DK2020/050071, filed on Mar. 19, 2020.

(30) Foreign Application Priority Data

Mar. 20, 2019 (DK) .......................... PA 2019 00339

(51) Int. Cl.
*A01C 7/12* (2006.01)
*A01C 7/04* (2006.01)
*A01C 7/10* (2006.01)
*A01C 7/16* (2006.01)

(52) U.S. Cl.
CPC ............... *A01C 7/125* (2013.01); *A01C 7/04* (2013.01); *A01C 7/102* (2013.01); *A01C 7/16* (2013.01)

(58) Field of Classification Search
CPC .. A01C 7/04; A01C 7/16; A01C 7/102; A01C 7/107; A01C 7/123; A01C 7/125
See application file for complete search history.

(56) References Cited

U.S. PATENT DOCUMENTS

| | | | | |
|---|---|---|---|---|
| 1,382,497 | A * | 6/1921 | Franks ..................... | A01C 7/04 222/271 |
| 1,509,291 | A * | 9/1924 | Griffith .................... | A01C 7/04 222/372 |
| 1,613,831 | A * | 1/1927 | Huntington et al. .... | A01C 7/04 222/359 |

(Continued)

FOREIGN PATENT DOCUMENTS

| CN | 102917579 A | 2/2013 |
|---|---|---|
| EP | 2550850 A1 | 1/2013 |

(Continued)

*Primary Examiner* — Tara Mayo
(74) *Attorney, Agent, or Firm* — Elevated IP, LLC (57) ABSTRACT

A method for placement of seeds one by one onto a growth medium, whereby initially seeds are extracted and singled-out from a disorderly group of seeds is disclosed. The method comprises: placement of the disorderly group of seeds onto a seed wheel which has a wheel plane, wherein the wheel plane is angled with respect to a horizontal plane such that single seeds are allowed to enter openings in the seed wheel which openings are distanced from a rotation axis of the seed wheel, whereby the seed wheel is rotated around the rotation axis which axis is perpendicular to the wheel plane thereby elevating a single seed in each opening out of the group of seeds and allowing singled-out seeds in each opening to leave the opening at a predetermined rotational position of the seed wheel and fall or trickle down a tube or chute onto a growth medium.

17 Claims, 8 Drawing Sheets

(56) References Cited

U.S. PATENT DOCUMENTS

| | | |
|---|---|---|
| 1,898,847 A | 2/1933 | Orlin |
| 3,492,954 A | 2/1970 | Rothfelder |
| 4,899,672 A | 2/1990 | Paul |
| 2014/0277965 A1* | 9/2014 | Miller et al. ......... A01C 21/005 |
| | | 701/50 |
| 2018/0242514 A1* | 8/2018 | Baurer et al. ......... H04L 5/0048 |
| 2019/0364718 A1* | 12/2019 | Garner et al. ......... A01C 7/105 |

FOREIGN PATENT DOCUMENTS

| | | |
|---|---|---|
| EP | 3366133 A1 | 8/2018 |
| JP | S5579814 U | 6/1980 |
| JP | S57149710 U | 9/1982 |
| JP | S59101615 U | 7/1984 |
| JP | S61108304 A | 5/1986 |
| JP | S63129908 A | 6/1988 |
| JP | H01137906 A | 5/1989 |
| JP | H0260512 U | 5/1990 |
| JP | 2000316322 A | 11/2000 |
| WO | 2008135772 A1 | 11/2008 |

* cited by examiner

METHOD AND SYSTEM FOR PLACEMENT OF SINGLE SEEDS ONE BY ONE

CROSS REFERENCE TO RELATED APPLICATIONS

This application is a continuation under 35 U.S.C. 111 of International Patent Application No. PCT/DK2020/050071, filed Mar. 19, 2020, which claims the benefit of and priority to Danish Application No. PA 2019 00339, filed Mar. 20, 2019, each of which is hereby incorporated by reference in its entirety.

FIELD OF INVENTION

The present invention relates to a method for placement of seeds one by one, whereby initially seeds are extracted and singled-out from a disorderly group of seeds which trickle onto a seed wheel.

BACKGROUND

From prior art document GB 1203271 a seed dispenser is known, wherein a disorderly group of seeds is singled out on a rotating seed wheel, which is conical with an upwardly pointing apex and comprises a serrated edge part arranged to receive seeds. The seeds are removed laterally from the serrations by a scraper, in order to fall down a chute to the ground. In order for the prior art seed wheel to single out seeds, the dosage of seeds onto the conically shaped seed wheel must be precise which is not always possible, and the serration of the edge part does not single out seeds in a secure manner.

From JPS557981 a sowing system is known in which seeds are singled out from a disorderly group of seeds, and followingly are sowed one by one, whereby initially seeds are placed as a disorderly group of seeds onto a seed wheel which is rotated about a rotation axis where the seed wheel has a plane which in use is angled with respect to a horizontal plane such that single seeds are allowed to enter through-going openings in the seed wheel which openings are distanced from a rotation axis of the seed wheel, thereby transporting a single seed in each opening out of the group of seeds and wherein singled-out seeds in each opening are allowed to leave the opening at a predetermined rotational position of the seed wheel and fall or trickle down a tube or chute whereby the singled-out seed falls out of the through-going opening in the seed-wheel in a generally downward direction, when the opening is caused to pass above a hole provided in a stationary backplate adjacent to the seed wheel whereby further, the seed is halted, after trickling down the chute at a temporary rest proximal to a growth medium.

U.S. Pat. No. 4,899,672 discloses the use of a temporary rest for a seed to be sown, whereby a gush of air or water is used to accelerate the seed from the temporary rest onto the ground. By the use of this sowing method the seeds in a row may be accurately spaced from each other.

Thus, there is a need for a method and an apparatus which ensures a precise and secure way to single out individual seeds. It is further desired that each individual seed position is obtained in a safe and secure manner.

BRIEF DESCRIPTION

The invention provides a method for singling out seeds from a disorderly group of seeds in order to sow single seeds, whereby initially seeds in a first step are placed as a disorderly group onto a seed wheel which is rotated about a rotation axis where the seed wheel has a plane which in use is angled with respect to a horizontal plane; such that single seeds are allowed to enter through-going openings in the seed wheel which openings are distanced from a rotation axis of the seed wheel, thereby transporting a single seed in each opening out of the group of seeds and wherein singled-out seeds in each opening are allowed to leave the opening at a predetermined rotational position of the seed wheel and fall or trickle down a tube or chute whereby the singled-out seed falls out of the through-going opening in the seed wheel in a generally downward direction, when the opening is caused to pass above a hole provided in a stationary backplate adjacent to the seed wheel whereby further, the seed is halted after trickling down the chute, at a temporary rest proximal to a growth medium.

According to the invention, the seed is released from the temporary rest in a second step at the command of an electrical signal in order to fall onto the medium at a predetermined position whereby this step is carried out for each seed while GPS and/or local positioning signals are acquired for each released seed during movement relative to the growth medium.

A method according to the invention may be used with a vehicle which comprises a range of assemblies adapted to carry out the two steps, whereby the assemblies are provided in a row transversely to the primary motion direction of the mentioned vehicle. When the vehicle travels along a curve, the inner most elements in such a range of assemblies must deliver fewer seeds than the outermost elements, in order that the seeds are sowed with uniform distance over the entire range. This may easily be accomplished by use of the GPS signals and drive mechanism for the vehicle, such that the assemblies for the first step and assemblies for the second step are controlled individually to deliver seeds at regular distances even if outermost assemblies travel longer distances than innermost assemblies during the same time interval. It will also be possible by use of the second assembly, to place seeds in the rows across the vehicle such that weeding may take place both along the grooves and by traveling a weeding iron transversely to the grooves, either by moving the weeding iron transversely to a travel direction of a vehicle or tractor, or alternatively to travel with the weeding iron in the ground continually, while moving transversely to the sowing direction by driving a tractor in a direction transversely to the grooves. This further requires, that the seeds are released from each member of the assembly for the second step in coordination with the remaining such assemblies. As the release of seeds is guided and controlled by a command and control system, this will be easy to implement.

By use of the temporary rest, and the electrically controlled release of the seed, it is further ensured, that a precise placement of seeds on a field is achieved.

In an embodiment an electrical command-signal provokes the energization of an electrical actuator whereby the actuator pulls a temporary rest away from underneath the seed for it to land at the predetermined position on the growth medium.

It is further contemplated that the temporary rest comprises walls which form a downwardly narrowing space and that the seed will tumble to a well-defined position between the walls.

In an embodiment the fall distance from the temporary rest to the growth medium is no more than 10 cm, no more than 5 cm, or no more than 25 mm.

In an embodiment the temporary rest is provided inside a delivery tube, where the temporary rest is caused to be extracted in a direction transversely to the tube axis from a position abutting the inside of the delivery tube wall.

In an embodiment the electrical actuator pulls at the temporary rest from a position adjacent to the delivery tube.

In an embodiment, whenever an electrical command signal is to be executed by the electrical actuator to pull at the temporary rest, a signal is advanced at a motor drive connected to the seed wheel to advance the seed wheel and cause a singled-out seed to be released therefrom.

The present invention also relates a system for singling out seeds from a disorderly group of seeds, and sowing the singled out seeds, by placement of single seeds one by one onto a growth medium, where the system comprises a seed wheel which is adapted to rotate about a rotation axis. The seed wheel has a wheel plane which is angled with respect to a horizontal plane when in use, where the seed wheel further comprises openings each provided within a distance from the seed wheel rotation axis, whereby the seed wheel is adapted to receive a disorderly group of seeds, such that a single seed shall enter each opening in the seed wheel which thereby shall transport a single seed in each opening out of the group of seeds.

With this system it is ensured that seeds are singled out in a secure and safe manner.

The system comprises a vehicle, which is fitted with an assembly comprising the seed wheel and the seed wheel is caused to rotate slidingly at a stationary back plate which back plate has a hole therein distanced from the rotation axis, such that by the rotation of the seed wheel about the rotation axis, openings therein will become aligned with the hole in the back plate, one after another. An upwardly facing surface of the seed wheel has a lower portion and an upper portion whereby the upper portion is raised above the lower portion due to the angulation of the seed wheel with respect to the horizontal plane, where the lower portion is adapted to receive the disorderly group of seeds such that by rotation of the seed wheel the openings therein will be filled one by one with a seed, which seed will leave the opening in the seed wheel through the hole in the back plate, whereby the hole in the back plate is placed in the region corresponding to the upper portion of the seed wheel.

With this arrangement it is ensured, that only one seed shall fall out of the seed wheel openings at a time, as the angulation ensures, that the disorderly group of seeds remains mainly in the lower part of the seed wheel.

A feed tube which connects a seed hopper to the seed wheel comprises an inverted funnel-like element at the seed wheel, where said funnel like element encircles the openings in the seed wheel and comprises a partition, which partition runs across the seed wheel in a generally horizontal direction and is elevated above the seed wheel where the funnel-like element at its periphery forms a seed tight connection with the seed wheel and parts the lower portion from the upper portion of the upwardly facing surface of the seed wheel. By connecting the funnel like element with seed boxes, it is possible to ensure, that seeds trickle from the seed boxes and onto the seed wheel without interference from any further implements, which simplifies the system a great deal compared to prior art systems.

A temporary rest for a seed which has been released is provided at a growth medium, and the temporary rest is adapted to transfer a singled-out seed therefrom to the growth medium at the command of an electrical signal.

According to the invention, the system further comprises a receiving system for GPS and/or local positioning signals which signals are routed to a command and control system which command and control system is connected to one or more movement generators adapted to move the vehicle with respect to the growth medium and where the command and control system is further connected to the temporary rest which is adapted to release singled-out seeds at the command of the electrical signal from the command and control system in order that the location of each seed is obtained.

In the system the temporary rest comprises downwardly narrowing walls, forming a funnel like rest, and at least one of these walls is arranged to move away from underneath the seed by being mechanically connected to a solenoid.

Further, the system the solenoid and the mechanical connection to the at least one wall which is arranged to move away from underneath the seed is provided at a delivery tube and arranged to give a fall distance of no more than 10 cm, or no more than 5 cm, or no more than 25 mm from the temporary rest in the delivery tube to the growth medium.

The invention also comprises the use of a system and method for sowing seeds for crops such as turnips.

The invention also relates to a sowing method whereby a vehicle having one or more motors for propulsion is used, which vehicle further comprises a control and command module, which receives GPS or similar positioning signals, such that the propulsion motors are controlled to guide the vehicle along a predetermined path and at a predetermined speed, whereby the vehicle is adapted to drive in this way over farm fields, whereby the control and command module is electrically connected to parts of the vehicle and elements attached to the vehicle which requires electric input signals or power, or which produces electrical power or sensory signals, whereby at the vehicle, a range of implements are provided for the delivery of seeds one by one onto or into the growth medium, while at the same time grooves are formed for the reception of singular seeds such that seeds are delivered into the newly formed grooves in two steps in order to acquire a precise location of each individual seed.

Accordingly, in a first step seeds are lifted, one by one, out of a disorderly group or stack of seeds and allowed to trickle towards the growth medium, and in a second step is halted prior to reaching the growth medium and caused to stay on a temporary rest proximal to the growth medium, and then released from the temporary rest according to timed control signals from the GPS system in order to obtain the position of each seed in the ground.

In an embodiment the vehicle carries a range of solar panels, and has primarily electrically driven propulsion means, and sensors, actuators and a control module are all interconnected by electrical wiring and electrically powered. In this way the vehicle may work autonomously in the field and deliver seeds in rows and keep exact track of each individual seed placed in the ground.

BRIEF DESCRIPTION OF THE DRAWINGS

The invention will become more fully understood from the detailed description given herein below. The accompanying drawings are given by way of illustration only, and thus, they are not limitative of the present invention. In the accompanying drawings.

DETAILED DESCRIPTION

Figure 1:
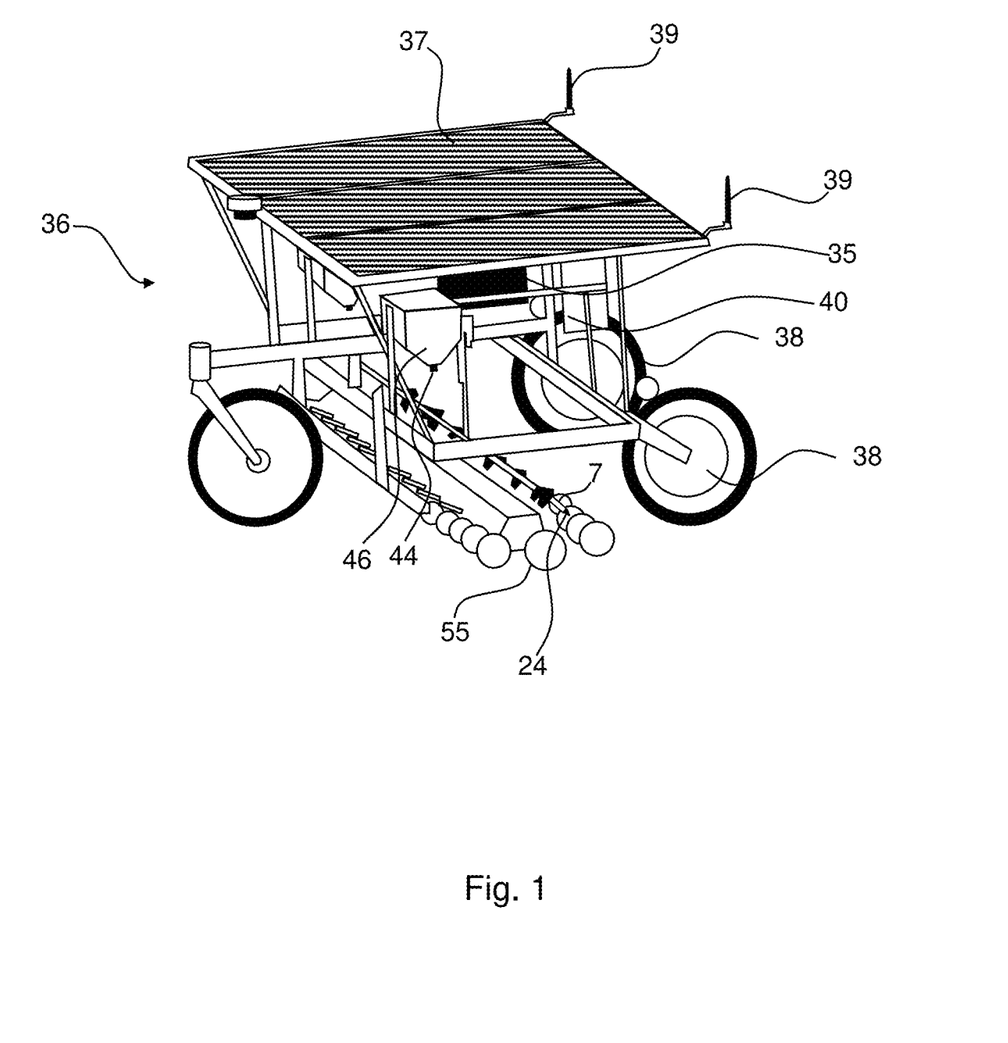
FIG. 1 shows a schematic view of a vehicle provided with single seed sowing implements.

Referring now in detail to the drawings for the purpose of illustrating preferred embodiments of the present invention, an overall view of a vehicle adapted for holding implements necessary for placement of seeds one by one onto a growth medium is illustrated in FIG. 1.

The vehicle 36 in FIG. 1 is fitted with solar panels 37 and a multitude of electric motors for propulsion, and further comprises a control and command module, which receives GPS or similar positioning signals, such that the propulsion motors may be controlled to guide the vehicle along a predetermined path and at a predetermined speed. The vehicle 36 is adapted to drive in this way over farm fields, which in advance have been prepared to receive seeds for a crop in the usual manner to ensure that the field will work as a suitable growth medium for the seeds. It is remarked, that the control and command module is electrically connected to each and any part of the vehicle and elements attached to the vehicle which require electric input signals or power, or which produce electrical power or sensory signals, even if such electrical wiring is not disclosed in detail. In the following such elements as solenoids, electrical motors, electrical sensors, GPS antennas or solar panels etc. are referred to, but even if not specified, it is clear that these elements are wired to the control and command module.

In the embodiment shown, the vehicle 36 has two individually driven wheels at the back, and a front wheel which is pivotally mounted to a frame member, in order that the drive speed imparted at each back wheel will direct the vehicle 36 in a desired direction. Other manners of self-drive may be used based on caterpillar or other propulsion means provided and controlled by the GPS signals as is known in the art.

Below the solar panels 37 a range of implements are provided for the delivery of seeds one by one onto or into the growth medium 2, while at the same time grooves 45 are formed for the reception of singular seeds 1. Usually the implement will also provide for means adapted to cover the seeds with material from the sides of the grooves 45.

Seeds 1 are delivered into the newly formed grooves 45 in one or two steps depending on whether precise location of each individual seed 1 needs to be determined, or whether only the distance between individual seeds in each row shall be controlled along with row placement and start and stop of each row.

In a first step, seeds are lifted, one by one, out of a disorderly group or stack of seeds 4 and allowed to trickle down into the groove 45 also one by one. This first step is always carried out, and in cases where a precise location of each particular seed is desired, a second step is carried out in that each seed is halted prior to reaching the growth medium 2 and caused to stay on a temporary rest 22 proximal to the growth medium, and then released from the temporary rest according to timed control signals from the GPS system.

The GPS antennas 39 seen in FIG. 1 are linked to a command and control system 40, which controls drive motors for the vehicle and the release of seeds from the first and/or the second step.

In an embodiment, the vehicle carries at least one non-electrical propulsion means, such as a combustion engine or electrical power cell which converts chemically bound energy into electric power or combinations of such power sources. In this embodiment, a combustion engine may be connected directly to driven wheels, or the combustion engine or power cell may produce electricity in order to power electrically driven propulsion motors. Also, electric power produced by an engine or a power cell may be used alone or in combination with photovoltaic cells and/or conventional batteries for ensuring power to possible power consuming elements, such as actuators, propulsion motors, sensors and a control module.

As seen in FIG. 1, the vehicle 36 comprises a range of assemblies 24, 26 to carry out the two steps, whereby the assemblies 24, 26 are provided in a row transversely to the primary motion direction of the vehicle 36. When the vehicle 36 travels along a curve, the inner most elements in such a range, must deliver fewer seeds than the outermost elements, in order that the seeds are sowed with uniform distance over the entire range. This may easily be provided for by use of the GPS signals and drive mechanism for the vehicle, such that the assemblies for the first step 24 and assemblies for the second step 26 are controlled individually to deliver seeds at regular distances even if outermost assemblies 24, 26 travel longer distances than innermost assemblies during the same time interval. It will also be possible, by use of the second assembly, to place seeds in the rows across the vehicle such that weeding may take place both along the grooves and by traveling a weeding iron transversely to the grooves, either by moving the weeding iron transversely to a travel direction of a vehicle or tractor, or alternatively to travel with the weeding iron in the ground continually, while moving transversely to the sowing direction by driving a tractor in a direction transversely to the grooves. This further requires, that the seeds are released from each member of the assembly for the second step 26 in coordination with the remaining such assemblies. As the release of seeds is guided and controlled by the command and control system 35, this will be easy to implement.

Figure 2:
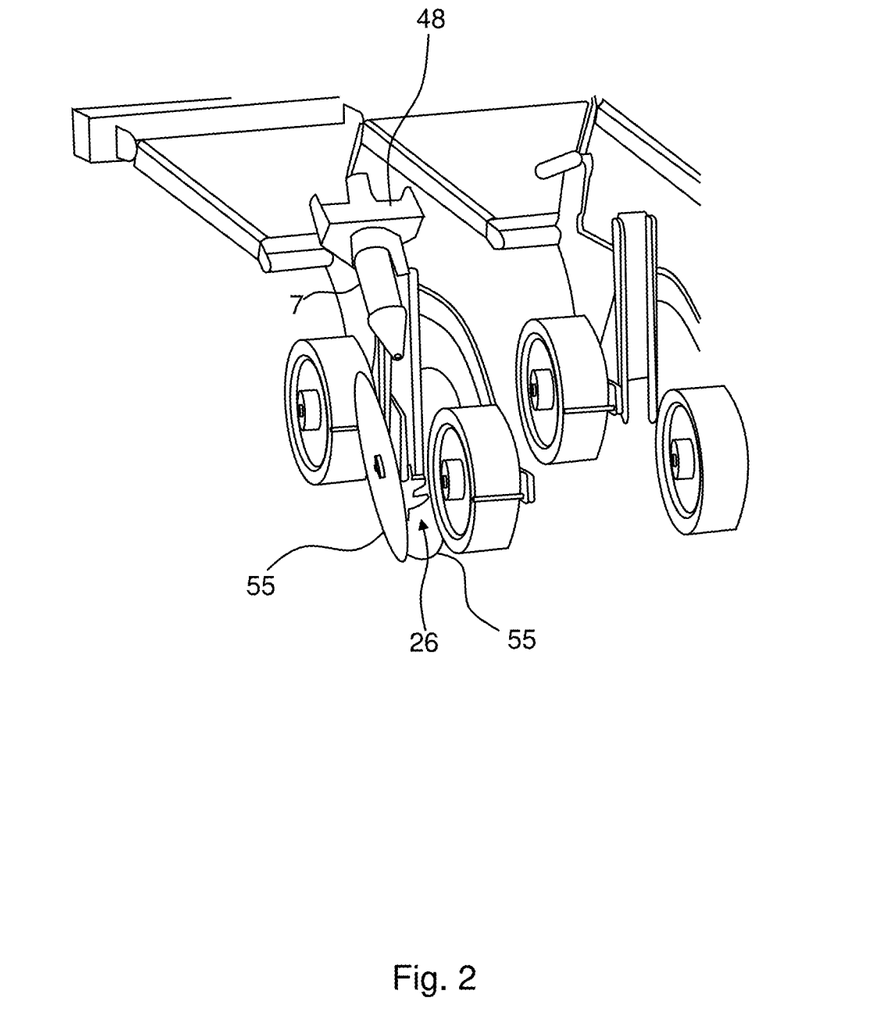
FIG. 2 shows a close-up view of a part of the single seed implement close to the ground.

A perspective view of the assembly to carry out the first step 24 is seen in FIG. 2. A seed wheel motor 7 is seen and in FIG. 3 and FIG. 4, it can be seen, that the motor 7 is connected to a stationary back plate 18 and arrange to rotate a seed wheel 6 relative to the back plate 18. The seed wheel has a rotation axis 16 which is aligned with the rotation axis of the output axis of the motor 7. In a customary manner, a flange is provided at the back plate for the mounting of the motor 7 thereto.

Figure 4:
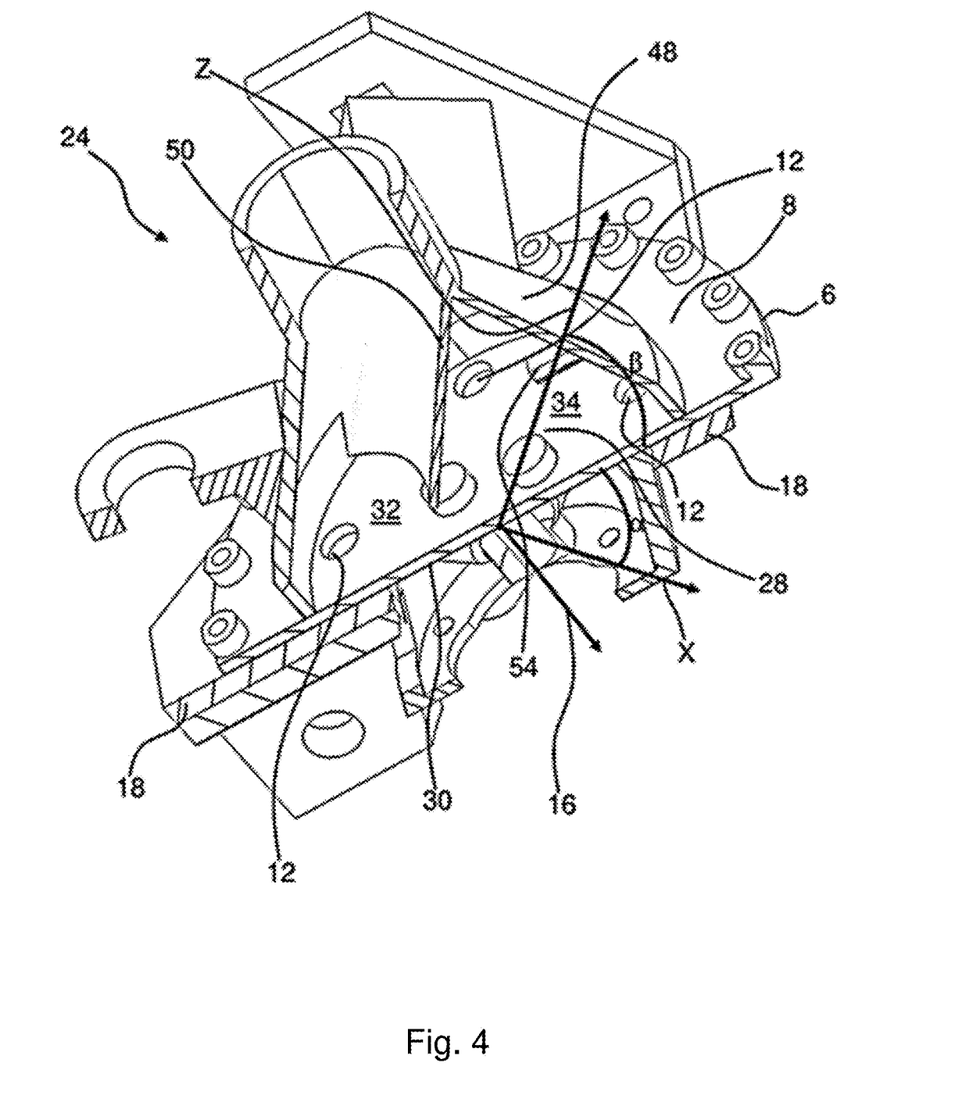
FIG. 4 shows a perspective sectional view of the singling mechanism.

The seed wheel rotation axis 16 is off-set from a vertical axis Z and followingly the seed wheel 6 rotates in a plane, which is off-set or tilted with respect to the horizontal plane. The seed wheel 6 thus comprises a plane 8, which has a generally upwardly facing surface 28 and a downwardly facing surface 30, where the downwardly facing surface 30 will abut against the back plate 18 and slide along the back plate when rotated.

Figure 5:
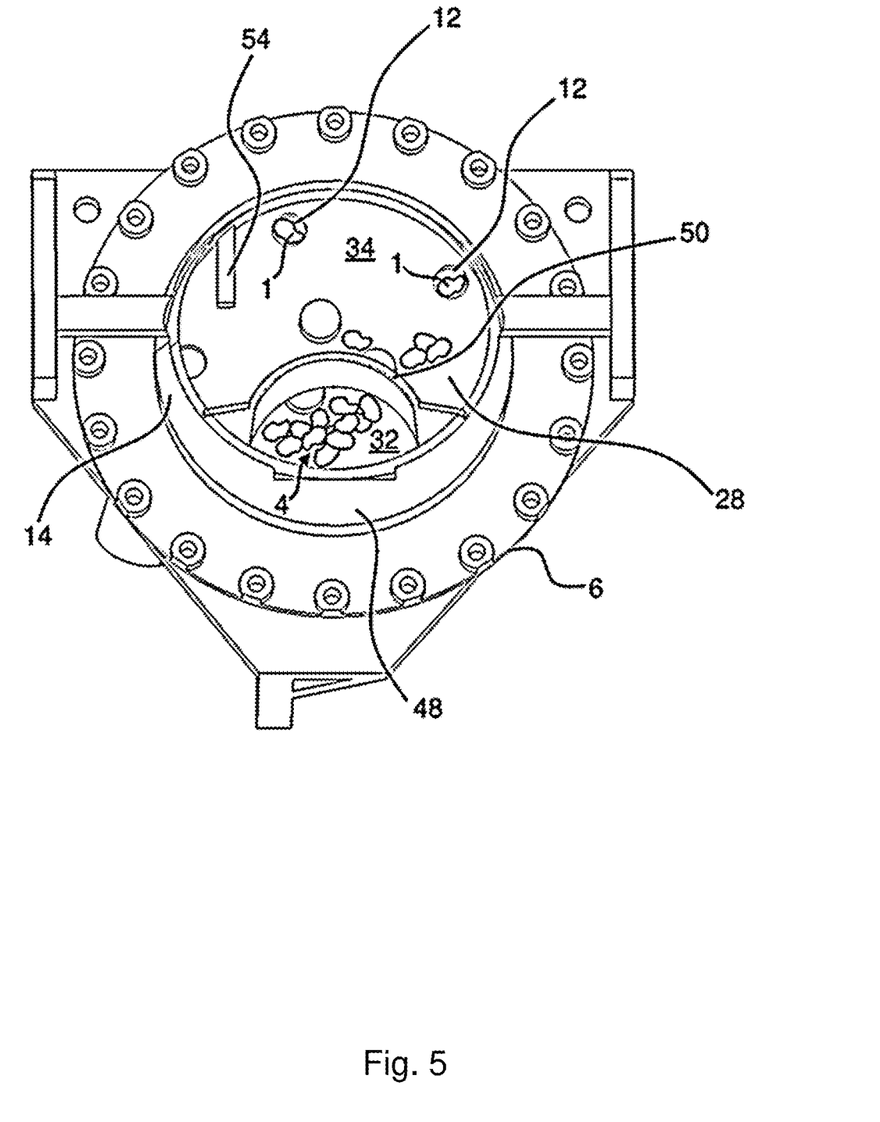
FIG. 5 shows the singling mechanism of FIG. 4 in a different sectional view.

The upwardly facing surface 28 will have a lower portion 32 and an upper portion 34, where the upper portion will be raised above the lower portion. A group of seeds 4 placed at the lower portion 32 will tend to stay here, even when the seed wheel 6 is rotated, as the gravitational pull will cause seeds to generally trickle downwards if they by chance are caused to travel along the seed wheel as it rotates. A number of through-going openings 12 are provided in the seed wheel 6 at a uniform distance from the rotational axis of the seed wheel. As seen in FIG. 5, a single seed 1 fits into each of these openings 12 and, when the seed wheel 6 is rotated, a seed from the disorderly group of seeds 4 will tumble into the opening 12 as the seeds tumble along the tilted plane of the seed wheel, and once a seed is inside the opening, it will move with the seed wheel rotation and be lifted gently out of the disorderly group of seeds. A hole 14 is provided in the stationary back plate 18, and provided the same distance from the rotation axis as the openings 12 in the seed wheel 6, such that when one of the openings 12 passes over and above the hole 14, the seed 1 inside the opening 12 may fall down through the hole 14, and thus be single out from the group of seeds 4.

The openings in the seed wheel may be circular and have sidewalls which are perpendicular to the seed wheel plane as disclosed in FIG. 4. However oblong openings or openings with conically shaped walls with respect to the seed wheel plane may be used, in case oblong seeds are to be singled out.

The singled-out seed 1 may fall or trickle down a chute or tube 42 to either end in the groove or land on a temporary rest 22 as explained in the following.

Figure 3:
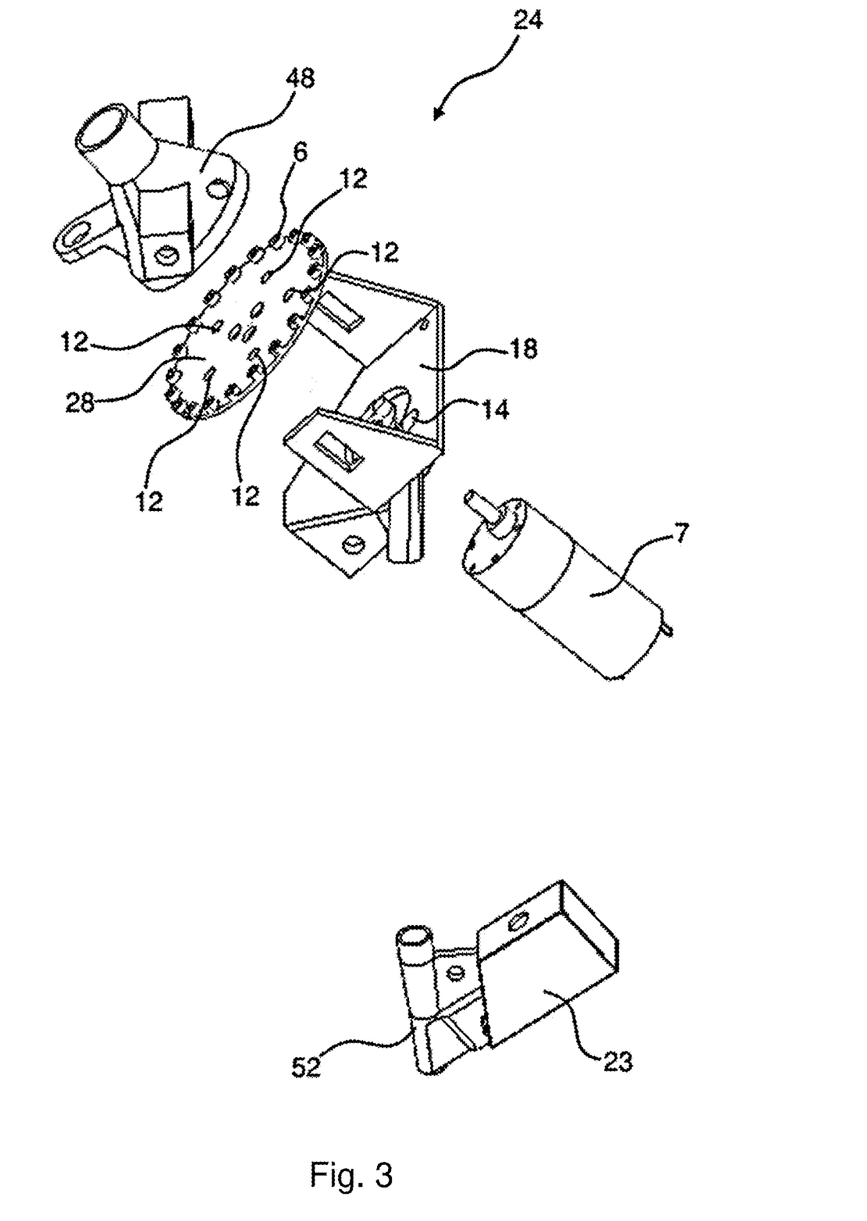
FIG. 3 is an exploded view in perspective reproduction of the various parts of a singling mechanism.

As seen in FIGS. 3, 4 and 5 a funnel like element 48 is provided above the seed wheel 6 and forms a seed tight enclosure with the seed wheel and is shaped to embrace the through-going openings 12. The funnel like element 48 will through its narrower top, be connected to orifices at the underside of a seed hopper 46 arranged above the assembly for the first step 24. The connection is not shown but may comprise a usual tube (see feed tube 44 in FIG. 1) or similar element without any narrow sections, such that seeds may trickle unhindered from an orifice at a lowermost part of the hopper 46 and down to the seed wheel 6. The funnel like element 48 has a transversely arranged partition 50 which runs above the seed wheel 6 and parts the lower portion 32 from the upper portion of the upwardly facing surface 28 of the seed wheel 6. As seen in FIG. 4 it is thus the lower portion 32 of the seed wheel upwardly facing surface 28 which will receive trickled down seeds 4 from the hopper 46. The partition 50 does not form a seed tight connection with the seed wheel upwardly facing surface 28, and some seeds may thus venture up along the seed wheel 6 towards the upper portion thereof due to motion caused by the moving of the vehicle over the field.

In FIG. 4 a vertical axis Z and a horizontal axis X are indicated. It can be seen that the angle α between the horizontal axis X and the seed wheel 6 is approximately 40 degrees. Moreover, it can be seen that the angle β between the vertical axis Z and the seed wheel 6 is approximately 50 degrees. Hereby, the downwardly vertical force exerted to the seed 1 by gravity is large enough to ensure that the seed 1 will fall through the hole 14 provided in the stationary back plate 18. At the same time, the risk of allowing several seeds 1 to fall through a specific opening 12 and the hole 14 provided in the stationary back plate 18 while the opening and the hole 14 are aligned, is eliminated.

An appropriate angle for seeds such as turnip seeds will be at 50 degrees with respect to horizontal as mentioned. But other angles are possible, and even angles close to the horizontal plane may work and also angles up to 70 degrees may function, however not as efficiently.

In order to ensure that only one seed at a time enters the tube 42, a seed guard 54 is provided as part of the funnel like element, where the seed guard is arranged at the inner side of the funnel like element 48 and stretches above the through-going opening 12. The seed guard 54 will ensure, that only the seed seated in a through-going opening 12 will enter down the opening 14, as any additional seeds layered on top of the seed in the opening 12 will be whisked off by the seed guard 54.

FIG. 2 is a schematic 3d rendering of the parts performing the two steps of the sowing, and also a groove forming element is disclosed, and in this embodiment the groove forming element comprises two opposed spade wheels 55 which when pressured towards the surface of the field and dragged along by the motion of the vehicle, will shovel or till a well-defined groove in the movement trace of the vehicle, due to their acute angle. The relative movement between the spade wheels 55 and the surface of the field will cause the wheels to rotate during their tilling of the groove as known in the art.

The chute or tube 42 has an opening at a lower part thereof, which is arranged to sit between the spade wheels 55 or at any other grove forming device proximal to the bottom of the groove 45 formed. Here seeds 1 are delivered, one by one, to the lowermost part of the groove 45.

During trickle down of the individual seed 1 towards the opening, the seed 1 is bound to bounce off the inside surface of the chute or tube 42 several times, and as a result the trickle-down time may vary from seed to seed, and also a sideways motion with respect to the opening 43 may affect the positioning of the seed in the groove.

In order to ensure both a secure timing and a precise positioning of the seed, whenever this is required, an assembly for a second step 26 is introduced, whereby the seed 1 is caused to pause at a rest 22 proximal to the growth medium. From this position the seed 1 is then released to drop a short distance to the bottom of the groove 45. During this drop, there are no surfaces to bounce off, and thus both time and place for the arrival of the seed at the bottom of the groove will be the same for each and every seed.

According to the above, the invention thus prescribes the use of two consecutive steps to deliver the seeds, and by a timed coordination between the two steps it is ensured, that each seed is delivered to its place on the growth medium at a precisely determined location. Especially the proximity between the assembly performing the second step and the growth medium ensures the required precision in timing and thus locating the seed at the growth medium. It is further noticed, that the distance between the first assembly performing the first step and the second assembly performing the second step cannot be too large, as seeds fall from the first to the second assembly, and fall times will inevitably vary, and vary more the longer the fall distance is. It is thus preferred that the fall distance between the first and the second assembly does not exceed 100 cm and preferably is no longer than 50 cm.

Figure 6A:
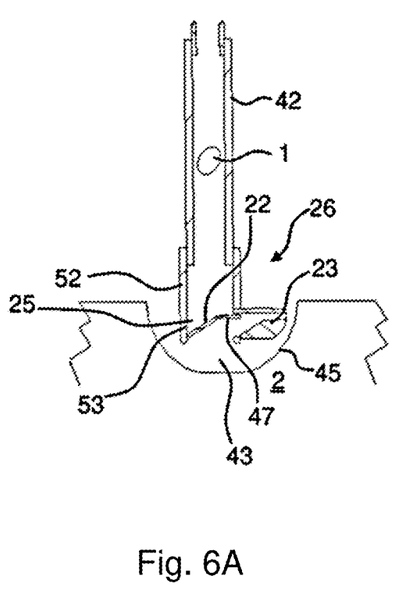
FIGS. 6A, 6B and 6C show the mechanics behind a final stage of delivering single seeds to the ground or growth medium in schematic sectional form and display the mechanism in three different working positions.
Figure 6B:
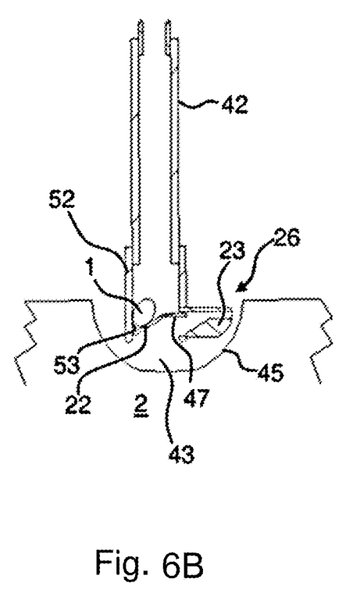
Figure 6C:
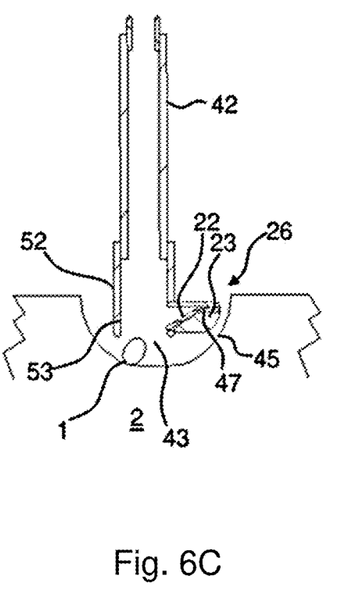
Figure 7A:
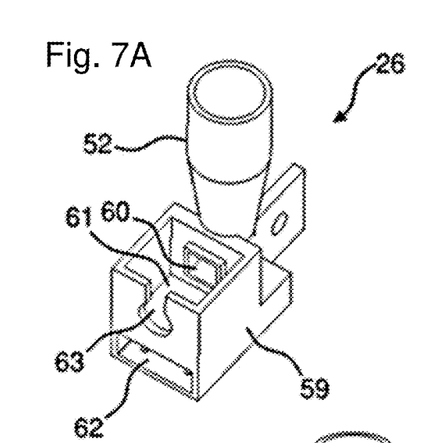
FIG. 7A shows a schematic 3D representation of the assembly 26.
Figures 7B, 7D:
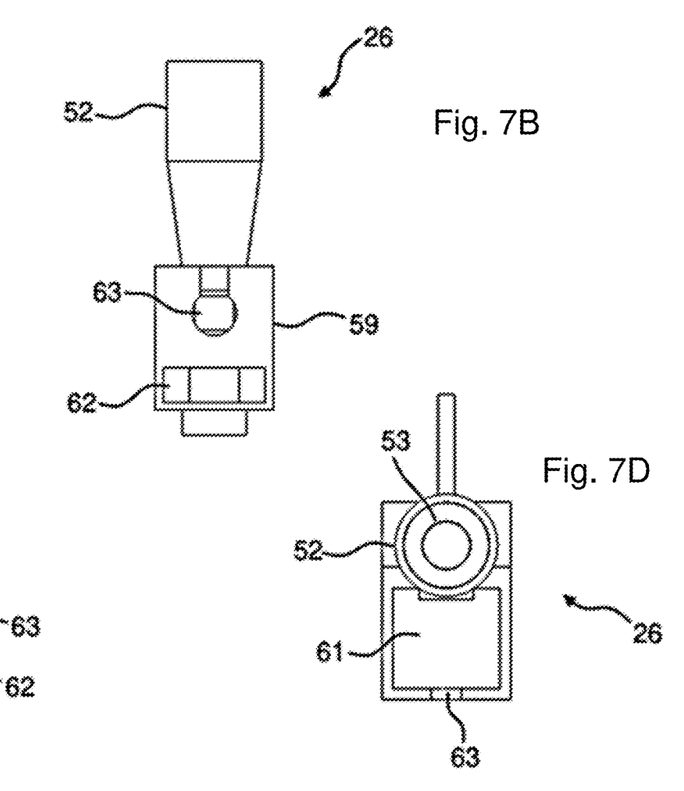
FIG. 7B shows a front view of the assembly 26.
FIG. 7D shows a view from above of the assembly 26 in FIG. 7A.
Figure 7C:
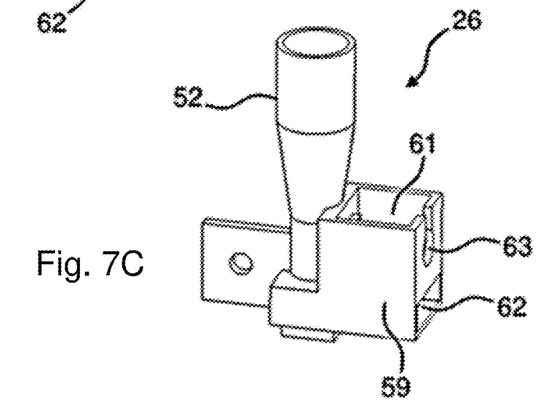
FIG. 7C shows the assembly 26 in FIG. 7A from a different angle.

FIGS. 6A, 6B and 6C each disclose a schematic sectional view through a groove, delivery tube and seed rest at 3 different functional stages: far left discloses the seed 1 on its way down the tube 42, middle discloses the seed now positioned at the rest 22, and far right discloses the situation, where the rest 22 has been pulled away from under the seed, and the seed 1 has just landed in the groove. The rest 22 is comprised of a downwardly narrowing space 25 provided in an assembly 26 for the timed release of the seed 1. The assembly comprise a delivery tube 52, and at the end of the tube or chute 42 and sideways from the delivery tube 52 a solenoid 23 or similar electromechanical element is provided. This element is responsive to an electrical input signal and adapted to pull a movable wall part 47, which is arranged as part of the downwardly narrowing space 25 in which the seed rests, away from underneath the seed 1. The seed 1 will come to sit on top of the rest 22, which in this embodiment is shaped by an upper, and angled surface of movable wall part 47. The movable wall part 47 may be moved in both directions to and from its position proximal to the inside of the delivery tube wall 53 by the solenoid, or alternatively, at least the return movement is spring operated such that the movable wall part 47 will always return to form the downwardly narrowing space 25 by abutting the inside of the tube wall part 52 for the arrival of the next seed to be added to the tilled groove.

The downwardly narrowing space 25 is instrumental in ensuring that seeds arriving here from above shall always be positioned at the same location with respect to the delivery tube 52, and this ensures, that seeds, even if not entirely of the same size and shape are likely to land at a precisely defined position in the groove 45 when released. In the illustrated embodiment according to FIG. 6 the movable wall part 47 and solenoid 23 are only indicated schematically, and other solutions than the one indicated in the three images of FIG. 6 are possible, such as solutions with further movable wall parts 47 either slidable or pivotally connected to the delivery tube 52. The solenoid 23 may be positioned at the tube as shown in FIG. 3 or positioned above the spade wheels 55 and mechanically connected, such as by wire, to the movable wall part 47.

When in use, the action of the solenoid 23 may be timed with the action of the seed wheel 6, such that the rotation of the seed wheel by the seed wheel motor 7 is instigated for the seed to arrive as shown in FIG. 6, far left, just when the movable wall part is released or commanded to abut the inside wall 53 of the delivery tube 52. Possibly the seed wheel 6 is not moved again, until the seed has been dropped out of the delivery tube as shown in FIG. 6 middle and far right.

Figure 8A:
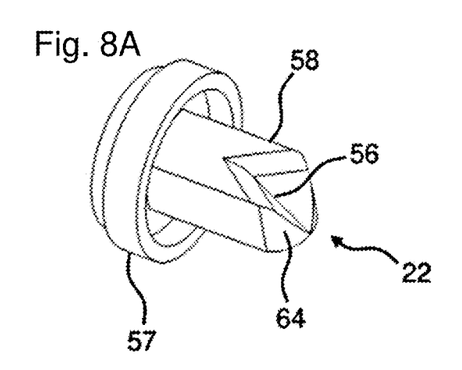
FIG. 8A shows a 3D representation of the rod member 58.
Figure 8B:
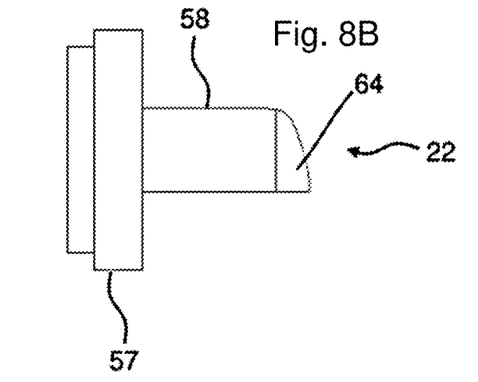
FIG. 8B shows a side view of the rod member 58.
Figure 8C:
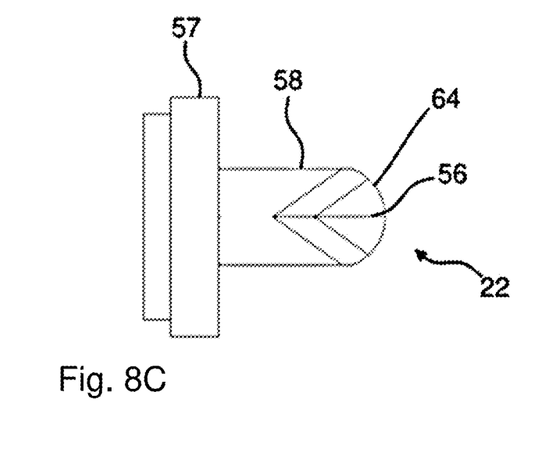
FIG. 8C shows a view from above of the rod member 58.

The assembly 26 disclosed in FIGS. 7A, 7B, 7C and 7D is similar to the assembly disclosed in FIG. 3. But further details are revealed as described in the following. The delivery tube 52 is intersected by a transverse opening 60, and in front of the opening 60, a compartment 61 is proved. The opening 60 and the rod member 58 disclosed in FIGS. 8A-8D is shaped to allow the rod member 58 to just fit inside the opening 60 and be able to slide easily back and forth. The compartment 61 is shaped such that a spring (not shown) may be inserted between a base portion 57, which is attached to rod member 58, and a distally placed wall of compartment 61, when the rod member 58 is inserted in the opening 60. The spring may be a compression spring, which urges the base portion 57, and thus the rod member forward into opening 60, whereby a distal part 64 of the rod member 58 shall abut an inside portion 53 of the delivery tube 52 (see FIG. 7D). As seen in FIG. 8C, the foremost part of distal part of rod member 58 is rounded to fit the inside portion 53 of delivery tube 52.

Figure 8D:
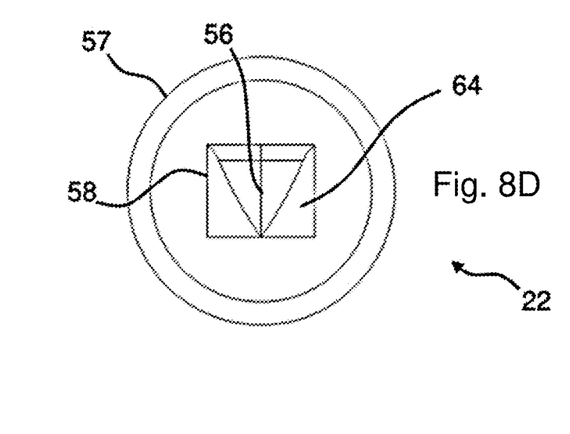
FIG. 8D is the front view of the rod member 58.

Outside the hole 63 in the distally placed wall, a solenoid is provided (not shown) and the active part thereof is connected to the base portion 57 through hole 63, such that whenever the solenoid is energized, the base portion 57 and with it, the rod member 58 is pulled towards the distally placed wall, and thereby an opening will appear between the foremost or distal part 64 of the rod member 58 and the inside of delivery tube wall 53. As seen in FIGS. 8A, 8C and 8D the distal part 64 of rod shaped member 58 also comprises a groove 56, shaped with downwardly sloping walls, and any seed 1 which is resting in the groove shall be released and tumble downwards when the rod member is pulled away from the inside portion 53 of delivery tube 52. The walls on both sides of the grove and the opposing inside portion 53 of the delivery tube makes out the mentioned downwardly narrowing space 25 in which seeds will be precisely placed prior to every release of a singled out seed 1. Whenever the solenoid is not energized, the spring (not shown) shall urge the base portion 57 and thus the rod member 58 forward to resume a position wherein the delivery tube 52 is blocked for passage of singled out seeds.

A further compartment 62 is disclosed below the compartment 61, and here a photovoltaic censor may be provided, which registers each passage of a seed through the delivery tube 52 below the temporary rest 22. The photovoltaic sensor may be of the kind comprising a light source and a light sensor, and preferably they shall be provided at each side of the delivery tube 52, which here may be transparent, or may be interrupted to allow the passage of the light from the light source to the sensor. This arrangement allows a safe and secure detection of each seed, which is released by the action of the solenoid.

The command and control system are connected to these electrical parts, and in case it is determined that no seed has passed, this may be registered together with the GPS coordinates for the missing seed. Hereby it becomes possible to make use of this information to either hand-sow missing seeds in the field, or when weeding, pass a weeding iron across the patch where the plant should have been sprouting, but now is missing. This also allows for surveillance of the sowing process and possible stop and call for service if it is determined, that seed after seed does not arrive as expected.

LIST OF REFERENCE NUMERALS 1 single seed
2 growth medium
4 group of seeds
6 seed wheel
7 seed wheel motor
8 seed wheel plane
10 horizontal plane
12 through-going openings
14 hole in the stationary back plate
16 seed wheel rotation axis
18 stationary back plate
22 temporary rest
23 electrical actuator or solenoid
24 assembly for first step
25 downwardly narrowing space
26 assembly for second step
28 upwardly facing surface of seed wheel
30 downwardly facing surface of seed wheel
32 lower portion of upwardly facing surface of seed wheel
34 upper portion of upwardly facing surface of seed wheel
35 control and command module
36 vehicle
37 solar panels
38 movement generators 39 GPS antennas
40 command and control system
42 tube or chute
43 opening of tube
44 feed tube
45 groove
46 seed hopper
47 movable wall part
48 funnel like element
50 partition of funnel like element
52 delivery tube
53 inside of delivery tube wall
54 seed guard
55 opposed spade wheels
56 groove
57 base portion
58 rod member
59 housing
60 opening
61, 62 compartment
63 hole
64 distal part
X horizontal axis
Z vertical axis
α, β angle

What is claimed is:

1. A method for singling out seeds from a disorderly group of seeds and sowing the singled out seeds, comprising:
    placing a disorderly group of seeds onto a seed wheel that is rotated about a rotation axis, the seed wheel having a plane which in use is angled with respect to a horizontal plane;
    receiving a single seed in an opening in the seed wheel, wherein the opening is distanced from the rotation axis of the seed wheel;
    allowing the single seed to leave the opening at a predetermined rotational position of the seed wheel through a hole in a stationary backplate adjacent the seed wheel and to fall down a chute;
    halting the single seed at a temporary rest of the chute proximal a growth medium, wherein a distance from the temporary rest to the growth medium is no more than 5 cm;
    releasing the single seed from the temporary rest onto the growth medium at a predetermined position; and
    recording geographic positioning data when the seed is released.

2. The method according to claim 1 further comprising repeating the steps of receiving, allowing, halting, releasing and recording to sow additional individual seeds.

3. The method according to claim 1, wherein an electrical signal energizes an electrical actuator that pulls the temporary rest away from underneath the single seed for the single seed to land at the predetermined position on the growth medium.

4. The method according to claim 3, wherein the temporary rest is moved in a direction transverse to a longitudinal axis of the chute.

5. The method according to claim 4, wherein the electrical actuator pulls at the temporary rest from a position adjacent to the chute.

6. The method according to claim 3, wherein whenever the electrical signal is to be executed by the electrical actuator to pull the temporary rest, a signal is advanced to a motor drive connected to the seed wheel to advance the seed wheel and cause another single seed to be released therefrom.

7. The method according to claim 3, wherein the temporary rest is moved in a direction that is only transverse to a longitudinal axis of the chute.

8. The method according to claim 1, wherein the temporary rest comprises walls that form a downwardly narrowing space such that the single seed will tumble to a well-defined position between the walls.

9. The method according to claim 1, wherein a distance from the temporary rest to the growth medium is no more than 25 mm.

10. A vehicle for singling out seeds from a disorderly group of seeds, and sowing the singled out seeds comprising:
    a seed wheel rotating about a rotation axis, the seed wheel having a plane which in use is angled with respect to a horizontal plane and which comprises openings that are distanced from the rotation axis of the seed wheel;
    the seed wheel rotating slidingly against a stationary back plate having a hole therein distanced from the rotation axis such that rotation of the seed wheel about the rotation axis causes openings in the seed wheel to become aligned with the hole in the stationary back plate;
    a tube connecting the hole in the stationary back plate and a temporary rest for a single seed, the temporary rest adapted to transfer the single seed to a growth medium in response to an electrical signal, wherein a distance from the temporary rest to the growth medium is no more than 5 cm; and
    a receiving system for receiving geographic positioning signals that are routed to a control system connected (i) to one or more movement generators that move the vehicle with respect to the growth medium and (ii) to the temporary rest to release the single seed in response to the electrical signal from the control system in order that the location of the single seed is obtained.

11. The system according to claim 10, wherein the temporary rest comprises walls that form a downwardly narrowing space, and at least one of these walls is moveable from underneath the seed when mechanically actuated by a solenoid.

12. The system according to claim 10, wherein a distance from the temporary rest to the growth medium is no more than 25 mm.

13. The system according to claim 10 further comprising:
    a feed tube connecting a seed hopper to the seed wheel through an inverted funnel-like element, the inverted funnel-like element encircling the openings in the seed wheel and comprising a partition elevated above the seed wheel and running across the seed wheel in a generally horizontal direction, the partition separating a lower portion from an upper portion of an upwardly facing surface of the seed wheel, wherein the funnel-like element at its periphery forms a seed tight enclosure with the seed wheel.

14. A sowing method comprising:
    guiding a vehicle along a predetermined path at a predetermined speed, the vehicle comprising implements for delivery of seeds onto or into growth medium and a command module that receives geographic positioning signals;
    separating an individual seed from a disorderly group of seeds;
    allowing the individual seed to fall towards a growth medium;
    halting movement of the individual seed on a temporary rest prior to the individual seed reaching the growth medium, wherein a distance from the temporary rest to the growth medium is no more than 5 cm; and releasing the individual seed from the temporary rest according to timed control signals from the command module in order to obtain a geographic position of the individual seed in the growth medium.

15. The sowing method according to claim 14, wherein the vehicle comprises solar panels for powering the vehicle and electrical components thereof.

16. The sowing method according to claim 14 further comprising repeating the steps of separating, allowing, halting, and releasing as the vehicle is guided along the predetermined path at the predetermined speed to sow additional individual seeds.

17. The sowing method according to claim 14, further comprising forming grooves in the growth medium as the vehicle is guided along the predetermined path at the predetermined speed.

* * * * *